United States Patent [19]

Chen et al.

[11] 3,816,728

[45] June 11, 1974

[54] MODULO 9 RESIDUE GENERATING AND CHECKING CIRCUIT

[75] Inventors: Tien C. Chen, San Jose, Calif.; Irving T. Ho, Poughkeepsie, N.Y.

[73] Assignee: International Business Machines Corporation, Armonk, N.Y.

[22] Filed: Dec. 14, 1972

[21] Appl. No.: 315,268

[52] U.S. Cl. .......... 235/153 BD
[51] Int. Cl. .......... G06f 11/10
[58] Field of Search .......... 235/153 BD, 175

[56] References Cited

UNITED STATES PATENTS

| | | | |
|---|---|---|---|
| 3,603,776 | 9/1971 | Weinberger | 235/175 |
| 3,636,334 | 1/1972 | Svoboda | 235/175 |
| 3,659,089 | 4/1972 | Payne et al. | 235/153 BD |
| 3,723,715 | 3/1973 | Chen et al. | 235/175 |

*Primary Examiner*—Charles E. Atkinson
*Attorney, Agent, or Firm*—Martin G. Reiffin

[57] ABSTRACT

A modulo 9 residue generating and checking circuit for checking the accuracy of decimal addition operations in digital computers and other data processing equipment. A set of data words each representing a number to be added is transmitted to a multi-number adder which adds the words and provides a smaller set of words as a subtotal sum. The bits of the subtotal words are then divided into two groups. Each group of bits is fed to a respective modulo 9 residue generator which calculates the modulo 9 residue of the group. The two resulting residues are then fed to a third modulo 9 residue generator which calculates the modulo 9 residue of the sum of the two residues, thereby providing the modulo 9 residue of the sum of the original set of data words. This result may then be compared in the conventional manner with the modulo 9 residue of the sum resulting from the addition operation to be checked.

25 Claims, 11 Drawing Figures

PATENTED JUN 11 1974 3,816,728

SHEET 3 OF 7

FIG. 5 COLUMN ADDER

L RESIDUE GENERATOR 15

S RESIDUE GENERATOR

MODULO 9 RESIDUE GENERATING AND CHECKING CIRCUIT

CROSS-REFERENCE TO RELATED APPLICATION

This invention preferably, but not necessarily, utilizes a portion of the multi-number adder disclosed and claimed in out prior copending application filed Aug. 25, 1971, Ser. No. 174,753 and now U.S. Pat. No. 3,723,715 issued Mar. 27, 1973, entitled "Fast Modulo Threshold Operator Binary Adder for Multi-Number Additions."

BACKGROUND OF THE INVENTION

1. Field of the Invention

This invention relates to a residue generating and error detecting circuit for residue checking the accuracy of the results of decimal addition operations in digital computers and other data processing equipment.

2. Description of the Prior Art

The use of decimal arithmetic in binary digital computers has become increasingly important in recent years and is expected to become even more important and perhaps even indispensable in the future. Computer users are accustomed to the exclusive use of decimal arithmetic in their non-computer thinking and they prefer that the computers be able to handle decimal arithmetic rather than only binary arithmetic. Furthermore, the use of binary arithmetic results in roundoff errors when dealing with certain decimal numbers and many users find the rounded off results either awkward or intolerable. For example, if the decimal number 0.05 is added to the decimal number 0.05, the result should be exactly the decimal number 0.10. However, a digital computer operating in binary arithmetic will not give this exact result.

While circuits for performing decimal arithmetic operations in binary digital computers are old in the prior art, these operations were not performed with the efficiency, speed and economy that many applications require. One of the basic problems in both decimal and binary arithmetic computations is error detection; that is, the determination of whether a particular arithmetic operation is correct. An important and widely used technique for error detection is residue checking.

The conventional prior art technique of residue checking is disclosed in FIG. 1 of the drawings. Referring to said figure, an augend number 1*a* and a single addend number 2*a* are added in an adder 3*a* to provide a resulting sum 4*a* which is to be checked for accuracy. A modulo m residue calculator 5*a* determines the residue modulo *m* of the addend number. This residue is the remainder left over after the addend number is divided by the maximum integral multiple of the modulus *m*. For example, if the addend number is 34 and the modulus *m* is 9, the number 9 goes into the number 34 a maximum of three times to give 27, thereby leaving a remainder of 7 which is termed the "residue modulo 9" of the addend number 34.

Similarly, another modulo *m* residue calculator 6*a* determines the residue modulo *m* of the augend number. The two residues are then added in an adder modulo *m* 7*a* which provides at its output the residue of the sum of the residue of the addend and the residue of the augend.

Since the residue of the sum of the residues of two numbers is equal to the residue of the sum of the two numbers, the output of the added modulo m 7*a* should be equal to the output of a third modulo m residue calculator 8*a* which determines the residue modulo m of the sum 4*a* to be checked. A comparator 9*a* compares these two outputs and if they are unequal an error 10*a* is thereby detected.

This prior art technique of residue checking is too inefficient, slow and uneconomical when a plurality of addends are to be added to an augend. In this case, the first addend is added to the augend to provide a first subtotal sum, the latter is then residue checked, the first subtotal sum is substituted in place of the augend, the second addend is then added to the first subtotal sum to provide a second subtotal sum, and this cycle of operation is repeated all over again for each of the successive addends until all have been added and the final total sum is residue checked. It will be clear that if there are many addends the entire addition operation is extremely time-consuming and expensive.

SUMMARY OF THE INVENTION

It is therefore a primary object of the present invention to provide a novel residue generating and checking circuit which can residue check the accuracy of the addition of a plurality of addends to an augend in a manner which is substantially faster, more efficient and more economical than the prior art residue checking circuit described above.

This object is achieved by a novel arrangement wherein the residue of the sum of the addends and augend is obtained substantially simultaneously. That is, the augend together with all the addends are processed in parallel, so as to obviate the necessity of a series of successive cycles of addition and residue checking for each of the successive addends.

The augend and all addends are fed to a multi-number adder preferably constructed in accordance with said prior copending application. The output of the multi-number adder is a subtotal sum in the form of a set of words which set is smaller than the set of addends and augends. The bits of the subtotal words are divided into a plurality of groups. Each group of bits is fed to a respective residue generator which calculates the residue of the group. The set of resulting residues, one from each generator, is then fed to additional residue generator means which calculates the residue of the sum of the residues of the group of bits. The result is the residue of the sum of the augend and all addends, and this result may be compared in the conventional manner with the residue of the sum to be checked.

Another important feature of the subject invention resides in the novel array logic circuits which are used to generate the required residues. These array circuits have matrix dimensions which are far smaller than would be required with conventional array logic circuits if utilized for this purpose.

DESCRIPTION OF THE PREFERRED EMBODIMENT OVERALL ARITHMETIC AND CHECKING SYSTEM

Figure 2:
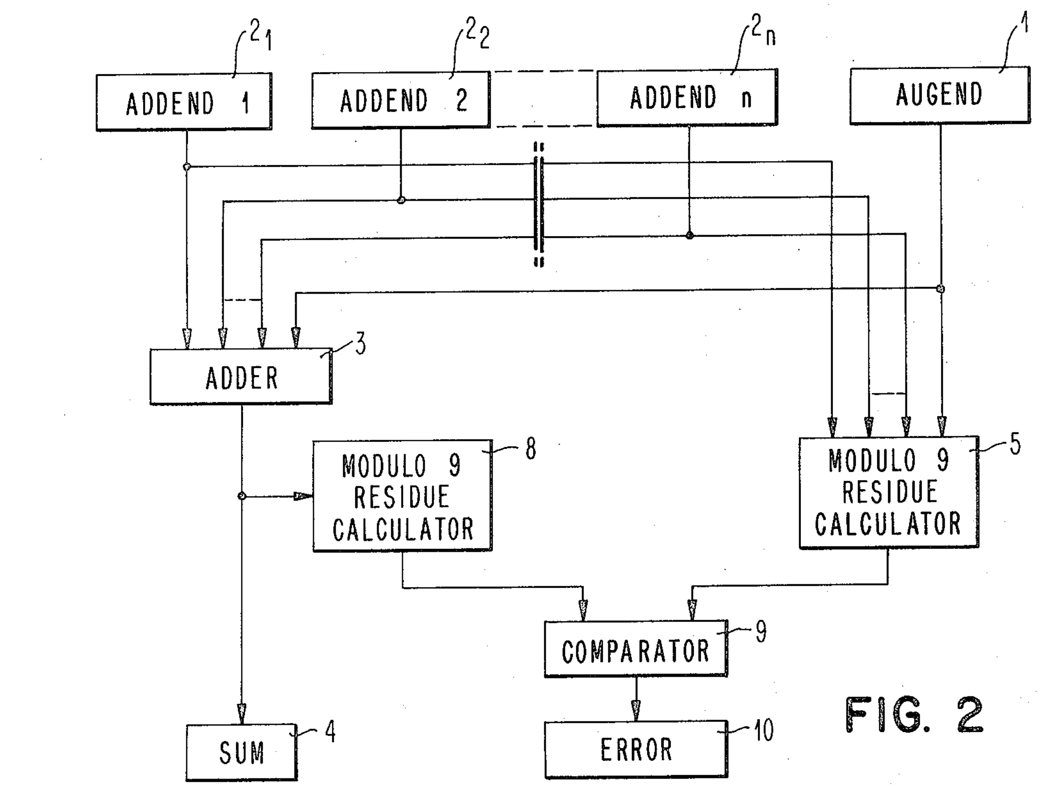
FIG. 2 is a block diagram showing the technique of the present invention for the addition of a plurality of addends to an augend and for residue checking the resulting sum.

Referring first to FIG. 2, there is shown a block diagram illustrating the technique of the present invention for the addition of a plurality of addends to an augend and for residue checking the resulting sum. This figure may be compared with the prior art technique illustrated in FIG. 1 described in detail above and having reference numerals corresponding to those of FIG. 2 but suffixed by the letter *a*.

In FIG. 2 in accordance with the present invention, a plurality of $n$ addend numbers $2_1, 2_2 \ldots 2_n$ are added to an augend number 1 in an adder 3 to provide a resulting sum 4 which is to be error detected; that is, checked for accuracy. Modulo 9 residue checking is employed for error detection. For this purpose, all of the data words comprising addends $2_1, 2_2, \ldots 2_n$ and augend 1 are fed to a modulo 9 residue calculator 5 which processes these $n+1$ data words simultaneously in parallel to calculate the residue modulo 9 of the sum of all the addends and the augend. A modulo 9 residue calculator 8 of any known construction determines the residue modulo 9 of the sum 4 to be checked for accuracy. A comparator 9 then compares the residue determined by calculator 8 with the residue determined by calculator 5, and if there is any difference in these two residues an error 10 is indicated.

Figures 1, 3:
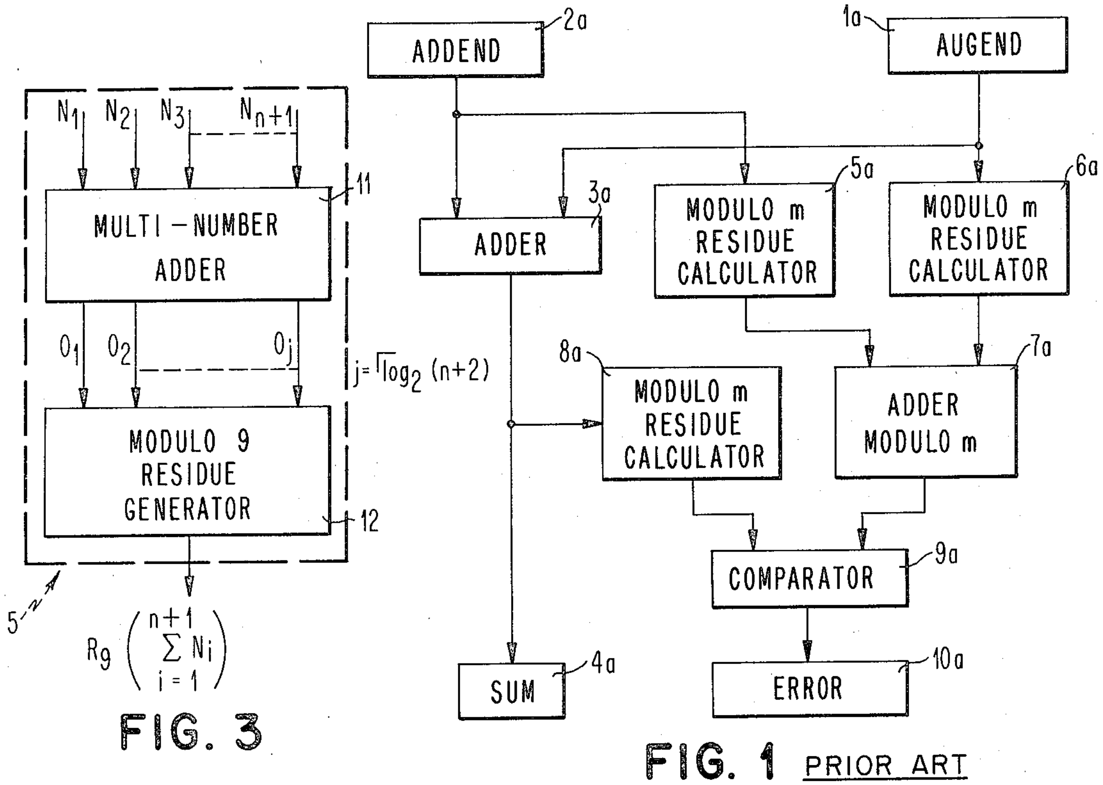
FIG. 3, FIG. 1 PRIOR ART
FIG. 1 is a block diagram showing the conventional prior art technique for the addition of a single addend to an augend and for residue checking the resulting sum.
FIG. 3 is a block diagram showing symbolically the addends and augend fed into the multi-number adder and the subtotal sum words fed from the adder to the modulo 9 residue generator.

Referring to FIG. 3, modulo 9 residue calculator 5 comprises a multi-number adder 11 and a modulo 9 residue generator 12. In FIG. 3, the $n+1$ data words comprising addends $2_1, 2_2, \ldots 2_n$ and augend 1 are symbolized by $N_1$ to $N_{n+1}$ and are fed to multi-number adder 11. The latter is preferably, but not necessarily, constructed in accordance with said prior copending application Ser. No. 174,753 and now U.S. Pat. No. 3,723,715 issued Mar. 27, 1973. Multi-number adder 11 provides at its output a set of words $O_1$ to $O_j$ constituting a subtotal sum, where $j$ is equal to the next highest integer of the logarithm to the base 2 of $(n+2)$. For example, in the disclosed embodiments there are seven data words to be added, comprising six addends and one augend, so that $n=6$ and $j=3$. Therefore the output of multi-number adder 11 consists of three subtotal sum words $O_1, O_2, O_3$ which are fed to the input of modulo 9 residue generator 12. The latter generates the residue modulo 9 of the sum of the three subtotal words $O_1, O_2, O_3$, which residue is also equal to the residue of the sum of the seven data words $N_1$ to $N_{n+1}$ being added.

MULTI-NUMBER ADDER 11

Figure 4:
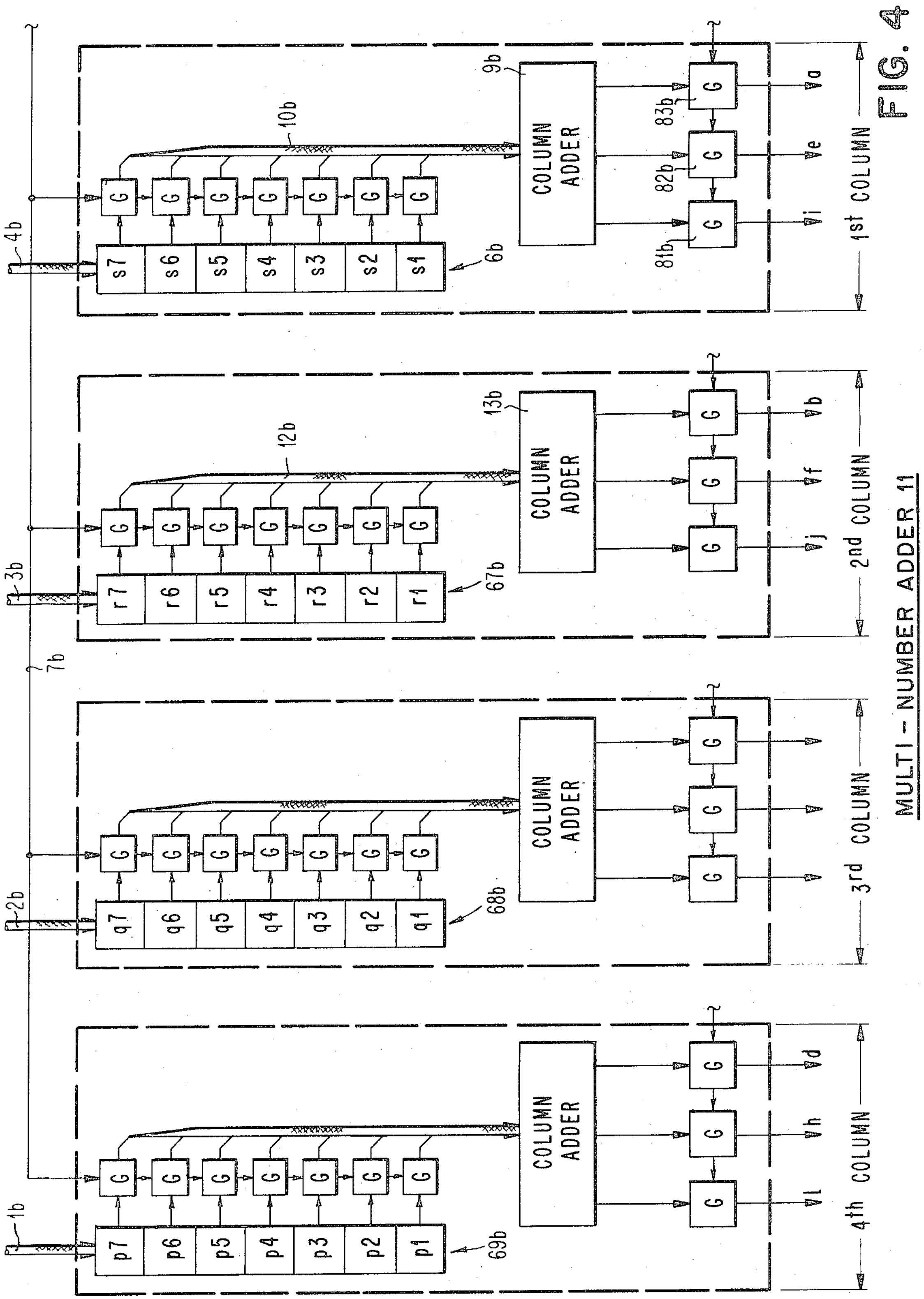
FIG. 4 is a block diagram showing the components of the multi-number adder.

Referring now to FIG. 4, there is shown a block diagram illustrating the components and arrangement of multi-number adder 11. It will be seen that FIG. 4 of the present application includes most but not all of the components shown in FIG. 1 of said prior application Ser. No. 174,753. A brief description of the structure and mode of operation of multi-number adder 11 will now be given, and further details may be obtained by referring to said prior application. The components of FIG. 4 of the present application are given the same reference numerals as the corresponding components of FIG. 1 of the prior application, with the addition of the suffix *b*.

Each of the seven data words to be added consists of four bits, each bit corresponding to a respective one of four columns. It will be understood that four-bit words are selected for brevity and clarity of illustration and that the words to be added may be any number of bits in length, in which case multi-number adder 11 will have additional columns corresponding to the bits in excess of four. Each bit of these seven data words to be added is designated by a prefix letter *p*, *q*, *r* or *s* designating the position and weight of the bit, and a suffix number 1, 2, ...7 designating the data word. For example, the first addend consists of bits *pl*, *ql*, *rl*, *sl*.

The seven data words are initially transmitted from a data source such as a buffer register (not shown) via cables 1*b*, 2*b*, 3*b*, 4*b*. Register 6*b*, associated with cable 4*b*, receives the least significant bits *s*1 to *s*7 of the data words to be added. Similarly, register 67*b* receives the second least significant bits *r*1 to *r*7, register 68*b* receives the third least significant bits, *q*1 to *q*7, and register 69*b* receives the most significant bits *p*1 to *p*7 of the data words to be added. After loading is thus accomplished in a conventional manner, an add signal is applied to bus 7*b* which simultaneously renders each of the gates G conductive. As a result, all the bits of the seven words to be added having the same weight are routed by the conducting gates G to a respective column adder such as adder 9*b*. The latter receives the least significant bits s1 to *s*7 from conducting gates G via cable 10*b*. At the same time, the second least significant bits *r*1 to *r*7 are routed via conducting gates G and cable 12*b* to column adder 13. The remaining bits *q*1 to *q*7 and *p*1 to *p*7 are similarly directed to respective column adders corresponding to the bit weights.

Figure 5:
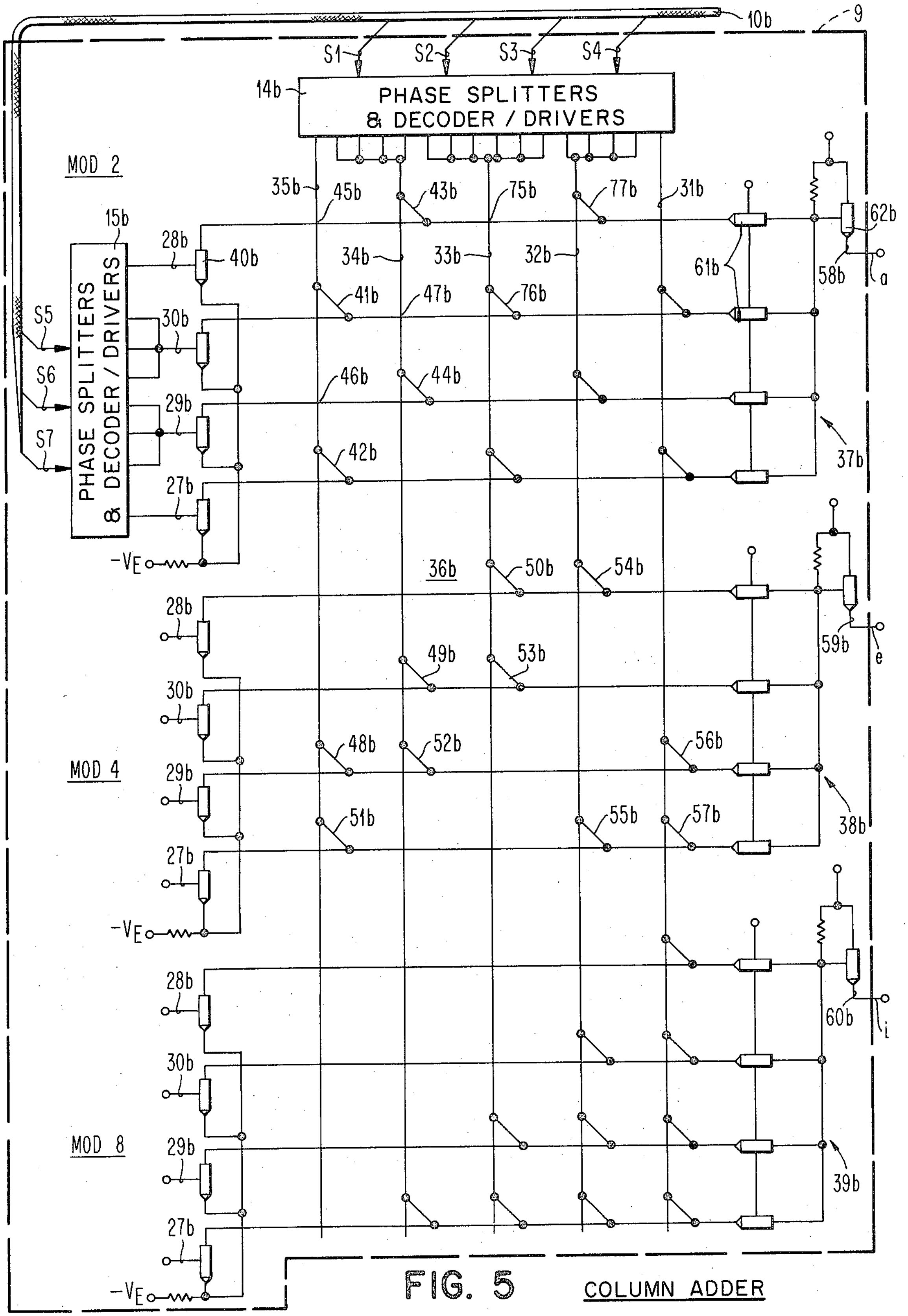
FIG. 5 is a block diagram showing the details of each column adder of the multi-number adder.

A typical column adder, such as column adder 9*b* of FIG. 4, is shown in FIG. 5. The least significant bits *s*1 to *s*7 of the seven words to be added are routed through conducting gates G and applied via cable 10*b* to phase splitters and decoder/drives 14*b* and 15*b* of FIG. 5. Four of the least significant bits, namely *s*1, *s*2, *s*3, *s*4 are applied to phase splitters and decoder/drivers 14*b*, whereas the most significant bits *s*5, *s*6, *s*7 are applied to phase splitters and decoder/drivers 15*b*. Phase splitters and decoder/drivers 14$b$ and 15$b$ are shown in detail in FIG. 3 of said prior application Ser. No. 174,753 and reference to made to the latter for a complete explanation of their structure and mode of operation.

Lines 31$b$ to 35$b$ inclusive constitute the Y-direction inputs to matrix 36$b$ consisting of portion 37$b$, portion 38$b$ and portion 39$b$. Each of said portions 37$b$, 38$b$, 39$b$ also receives the same X-direction inputs on lines 28$b$, 30$b$, 296 27$b$. Said X-direction inputs are inverted by inverters 40$b$ solely to meet the conduction requirements of the transistor switches which have been selected in the preferred embodiment to establish selective connections at predetermined crossovers in the matrix 36$b$. As shown in FIGS. 10 and 11, the base of each transistor Q1 is connected to one of the Y-direction lines $y$, and the collector of transistor Q1 is connected to a source of reference potential $V_s$. In FIG. 10 the emitter of transistor Q1 is connected to one of the X-direction lines 28, 30, 29, 27 indicated at $x$ in FIG. 10. In FIG. 11 another matrix crossover is shown where transistor Q2 has its emitter unconnected to the X-direction line $x$. Thus, an addressed transistor switch or matrix crossover such as at Q1 is rendered conductive when the potential of the Y-direction line $y$ rises and the potential of the X-direction line $x$ falls so as to forward bias the base-emitter junction of transistor Q1. Inverters 40$b$ would not be required if another type of transistor switch had been selected for the matrix crossovers so as to require simultaneous signals of the same polarity on the Y-direction and X-direction lines. The connected transistor switches, such as shown in FIG. 10, are represented in FIG. 5 and the remainining FIGS. 6 to 9 by short line segments, such as line segments 41$b$, 42$b$, 43$b$, 44$b$. Those matrix crossovers which are not connected, as in FIG. 11, are indicated by the absence of such short line segments.

It will be noted that the transistor switch connections at crossovers of matrix 36$b$ follow a pre-established pattern. For example, the transistor switch connections are made along every second diagonal of the matrix portion 37$b$. That is, there is no connection at matrix crossover 45$b$ while there are matrix crossover connections 41$b$ and 43$b$ along the next following diagonal of portion 37$b$. Likewise, there are no connections at matrix crossovers 46$b$, 47$b$ and 75$b$ which lie along the succeeding diagonal of matrix portion 37$b$, whereas there are transistor switch connections 42$b$, 44$b$, 76$b$, 77$b$ along the following diagonal, and so on. The situation in matrix portion 38$b$ is similar except that transistor switch connections are omitted along the first two diagonals but are present in both of the next succeeding two diagonals (such as connections 48$b$, 49$b$, 50$b$ and connections 51$b$, 52$b$, 53$b$, 54$b$). Transistor switch connections are absent along the next following two matrix diagonals and then reappear along the last two diagonals as shown by connections 55$b$, 56$b$, 57$b$. The matrix crossover pattern of portion 37$b$ is termed "modulo 2" in view of the fact that the pattern of crossover connections repeats itself over a cycle of two matrix diagonals. Similarly, the pattern of matrix crossover interconnections of portion 38$b$ is termed "modulo 4" considering that the crossover connection pattern repeats itself over a cycle of four matrix diagonals. Lastly, the crossover connection pattern of matrix portion 39$b$ is termed "modulo 8" in view of the pattern repetition cycle of eight matrix diagonals as shown in FIG. 5.

Matrix portions 37$b$, 38$b$, 39$b$ provide respective outputs representing the sum bit output designated $a$ on line 58$b$, carry bit output designated $e$ on line 59$b$, and carry bit output designated $i$ on line 60$b$. Each of the output bits $a, e, i$ is produced by ORing the X-direction lines of the respective matrix portion with the aid of isolation transistors 61$b$ and summing transistor 62$b$ as shown in matrix portion 37$b$. The bits $a, e, i$ represented by signals on output lines 58$b$, 59$b$, 60$b$ of FIG. 5 can be summarized explicity as follows: bit $a$ is a 1 if one, three, five or seven of the seven bits $s1$ to $s7$ at the inputs to phase splitters and decoder/drivers 14$b$, 15$b$ is a 1. Bit $e$ is a 1 if two, three, six or seven of the input bits are 1. Bit $i$ is a 1 if four, five, six or seven of the input bits are 1.

In a similar manner, the second least significant bits $r1$ to $r7$ are added in column adder 13$b$ to provide a sum bit $b$ (FIG. 6) and two carry bits $f$ and $j$. The third least significant bits $q1$ to $q7$ are similarly added in their respective column adder to provide a sum bit $c$ and two carry bits $g$ and $k$. The most significant bits $p1$ to $p7$ are added in the fourth column adder to provide a sum bit $d$ and two carry bits $h$ and $l$

MODULO 9 RESIDUE CALCULATOR 5

Figure 6:
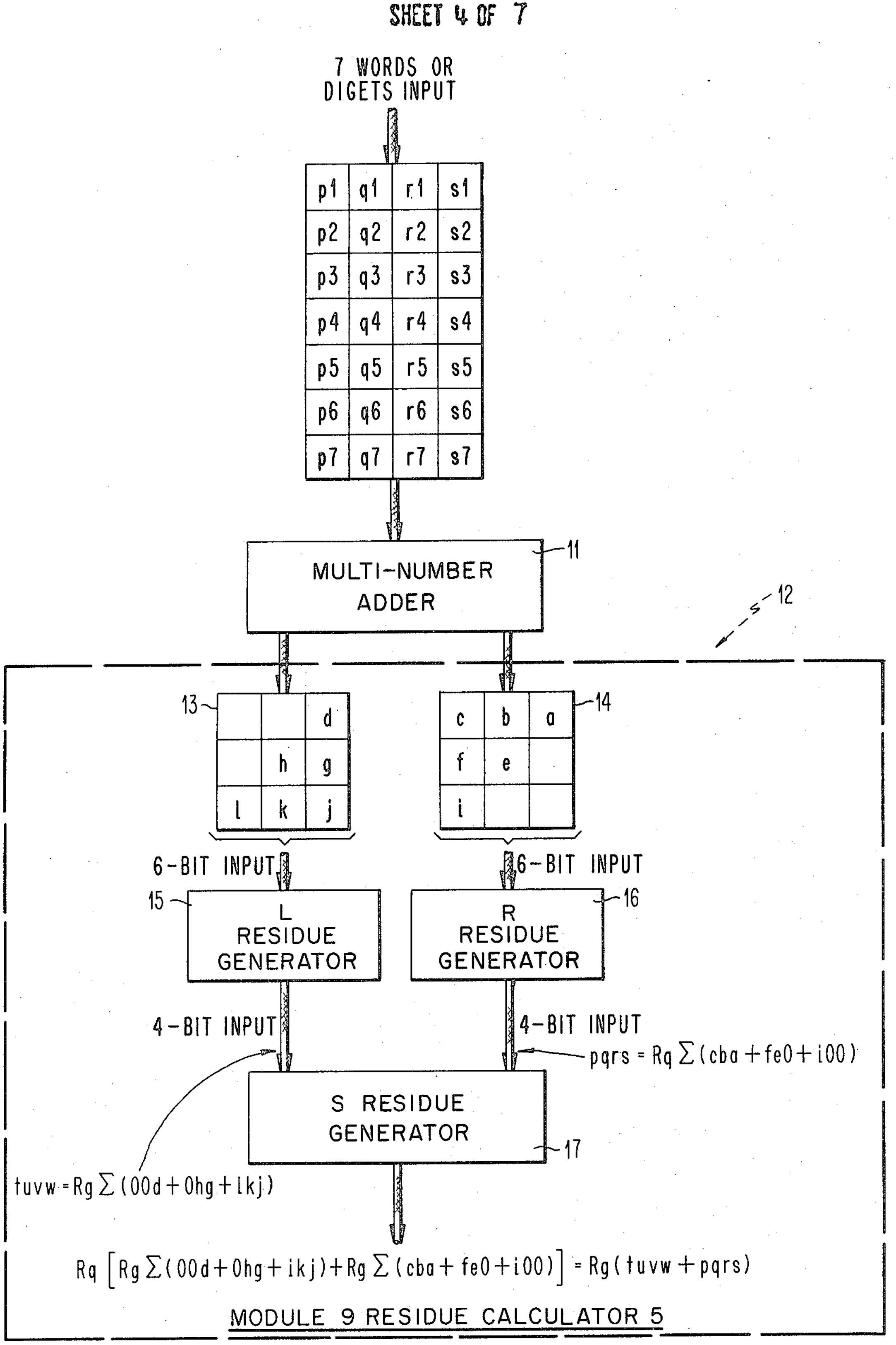
FIG. 6 is a schematic block diagram of the present invention and also shows symbolically the bits of the addends and augend fed into the multi-number adder, and the bits of the subtotal sum words fed from the output of the multi-number adder to the L and R residue generators.
Figures 7, 10, 11:
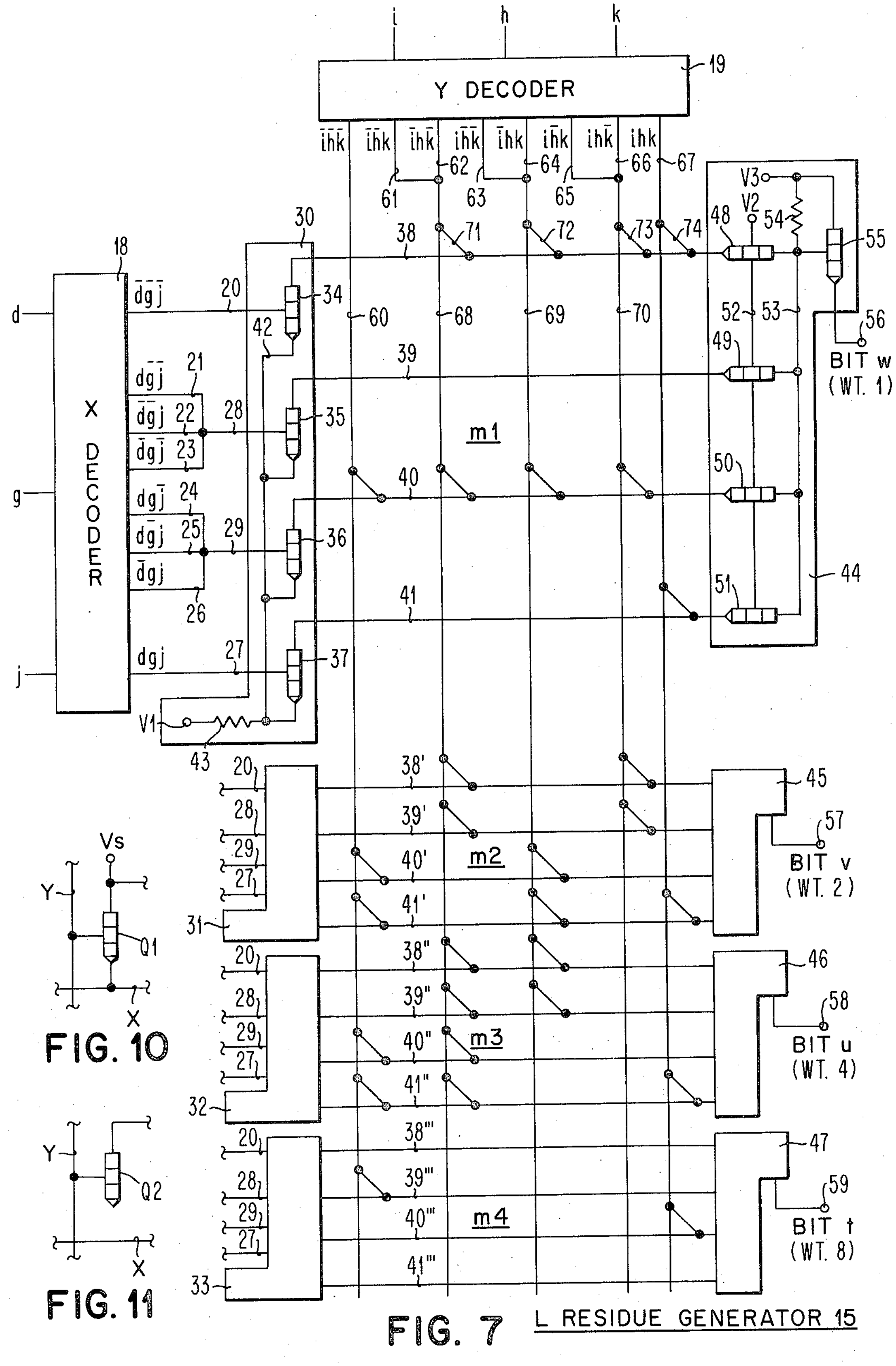
FIG. 7 is a block diagram showing the details of the L residue generator.
FIG. 10 shows a connected matrix crossover as used in the matrices of the array logic circuits of FIGS. 5 to 9 inclusive.
FIG. 11 shows an unconnected matrix crossover.

Referring to FIG. 6, modulo 9 residue calculator 5 is shown in more detail. The twelve sum and carry bits a to $l$ resulting from the column addition in multi-number adder 11 are shown arranged in columns according to their respective weights; that is, sum bit a has a weight of 1, sum bit $b$ and carry bit $e$ have a weight of 2, sum bit $c$ and carry bits $f$ and $i$ have a weight of 4, etc. The bits $a$ to $l$ are divided into two groups 13, 14 with the more significant bits (those of greater weight) $d$ to $l$ in group 3 and the less significant bits $a$ to $i$ in group 14. The bits of group 13 consist in effect of three words: $OOd$, $Ohg$, $lkj$. The bits of group 14 consist in effect of three words: $cba, feO, iOO$.

The bits of group 13 are fed to an L residue generator 15 which generates the residue modulo 9 of the sum of the three words $00d + 0hg + lkj$, in a manner to be described below with respect to FIG. 7. Similarly, the bits of group 14 are fed to an R residue generator 16 which determines the residue modulo 9 of the sum of words $cba+feO+iOO$, in a manner to be described below with respect to FIG. 8. The residue at the output of L residue generator 15 is in the form of a four-digit word designated $tuvw$, and the residue at the output of R residue generator 16 is in the form of a four-bit word designated $pqrs$. The two residues $tuvw$ and $pqrs$ are then fed to an S residue generator 17 which determines the residue modulo 9 of the sum of $tuvw$ and $pqrs$, in a manner described in detail below in connection with FIG. 9. This output residue of S residue generator 17 is equal to the residue of the sum of addends $2_1, 2_2 \ldots 2_n$ and augend 1, and is then transmitted to comparator 9 (FIG. 2) for comparison with the output of modulo 9 residue calculator 8.

L RESIDUE GENERATOR 15

Referring now to FIG. 7, there is shown the array logic circuit constituting L residue generator 15. The latter comprises an X decoder 18 and a Y decoder 19. Signals representing bits $d, g, j$ are fed to the inputs of decoder 18, and signals representing bits $i, h, k$ are fed to the inputs of decoder 19. The outputs 20, 21, 22, 23, 24, 25, 26 of decoder 18 provide combinations of true and complemented versions of bits $d$, $g$, $j$ as shown in the drawing. Outputs 21, 22, 23 are connected to a common line 28, and outputs 24, 25, 26 are connected to a common line 29. Lines 20, 28, 29, 27 are fed to a plurality of inverters 30.

The logic array circuit comprises four matrix portions $m1$, $m2$, $m3$, $m4$. Inverters 30 are associated with matrix portion $m1$, and similar inverters 31, 32, 33 are associated with matrix portions $m2$, $m3$, $m4$, respectively. Each set of inverters 30, 31, 32, 33 comprises four transistors 34 having their bases connected respectively to lines 20, 28, 29, 27 and their collectors connected respectively to lines 38, 39, 40, 41. Similarly, the collectors of inverters 31 of matrix portion m2 are connected to lines 38', 39', 40', 41'; the collectors of inverters 32 of matrix portion $m3$ are connected to lines 38'', 39'', 40'', 41''; and the collectors of inverters 33 are connected respectively to lines 38''', 39''', 40''', 41''' of matrix portion $m4$. The emitters of transistors 34, 35, 36, 37 are connected to a line 42 in turn connected to one end of a resistor 43 having its other end connected to a potential source V1. Lines 38, 39, 40, 41 of matrix portion m1 are connected to the emitters of a set 44 of transistors 48, 49, 50, 51 and the other lines of matrix portions m2, m3, m4 are similarly connected to sets of transistors 45, 46, 47. The bases of transistors 48, 49, 50, 51 are connected by line 52 to a source of potential V2 and their collectors are connected by a line 53 to the lower end of a resistor 54 having its upper end connected to a source of potential V3. The lower end of resistor 54 is also connected to the base of an emitter follower output transistor 55 having its collector connected to potential source V3 and its emitter connected to an output terminal 56. In a similar manner, matrix portions $m2$, $m3$, $m4$ are provided with respective output terminals 57, 58, 59.

Decoder 19 has 8 outputs designated 60 to 67 inclusive each providing a combination of true and complement versions of input signals $i$, $h$, $k$. Outputs 61, 62 are connected to line 68, outputs 63, 64 are connected to line 69, and outputs 65, 66 are connected to line 70. At various crossovers of horizontal lines 38, 39, 40, 41 and vertical lines 60, 68, 69, 70, 67 there are provided crossover interconnections as shown in FIG. 10 and described above. These are designated by short line segments such as at 71, 72, 73, 74. Those crossovers not having such short line segments are unconnected as shown in FIG. 11 and described above. The connected matrix crossovers perform the AND function of the signals on the respective horizontal and vertical lines. As a result, there are provided at the respective outputs 56, 57, 58, 59 the bits $w$, $v$, $u$, $t$ as described above with respect to FIG. 6.

R RESIDUE GENERATOR 16

Figure 8:
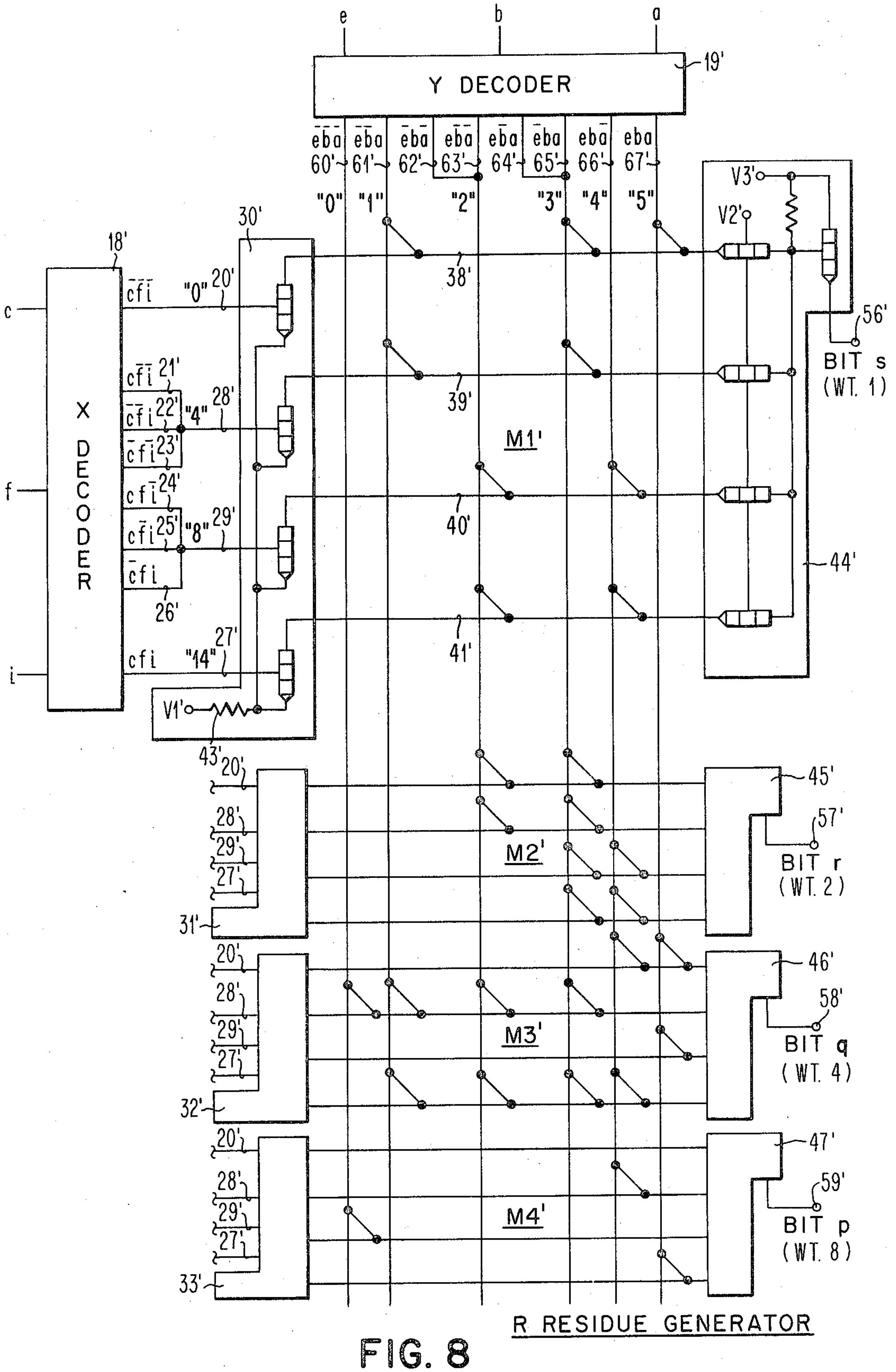
FIG. 8 is a block diagram showing the details of the R residue generator.

Referring now to FIG. 8, there is shown the R residue generator 16 which is substantially similar in structure and mode of operation to L residue generator 15 described above with respect to FIG. 7 but having matrix crossover connections at different points in the respective matrix portions. The various components in FIG. 8 are therefore given reference numerals corresponding to the respective components in FIG. 7 with the addition of a prime symbol at the end thereof. For example, the X decoder in FIG. 8 is designated 18' and the Y decoder in FIG. 8 is designated 19'. Signals representing bits $a$, $b$, $e$ are fed to the inputs of decoder 19' and signals representing bits $c$, $f$, $i$ are fed to the inputs of decoder 18'. The bits $s$, $r$, $q$, $p$ described above with respect to FIG. 6 appear at the outputs 56', 57', 58', 59' respectively.

S RESIDUE GENERATOR 17

Figure 9:
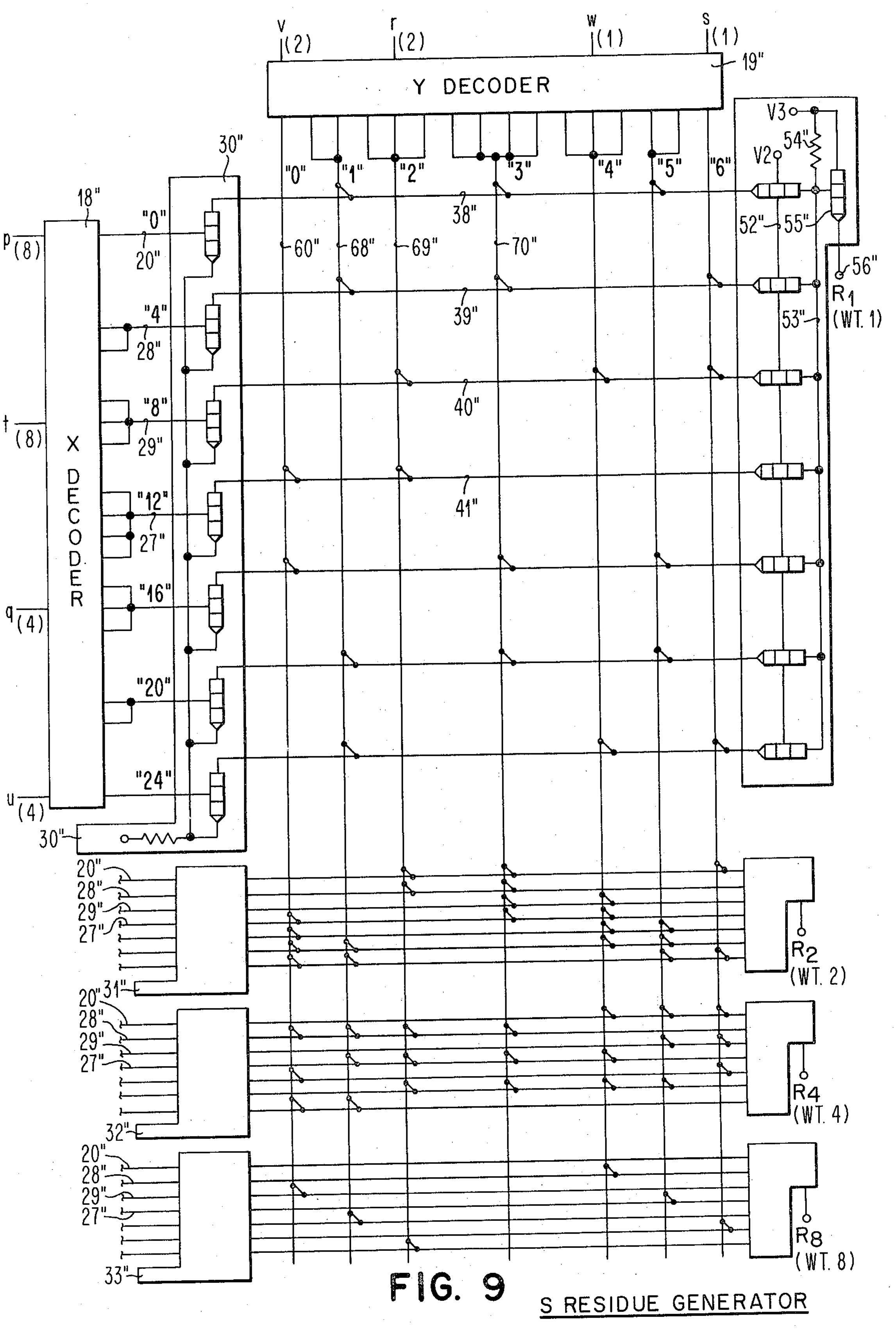
FIG. 9 is a block diagram showing the details of the S residue generator.

Referring to FIG. 9, there is shown the S residue generator 17 which is similar in construction and mode of operation to L residue generator 15 described above with respect to FIG. 7. The corresponding components of S residue generator 17 in FIG. 9 are given the same reference numerals as those in FIG. 7, followed by a double prime. For example, in FIG. 9 the X decoder is designated 18'' and the Y decoder is designated 19''. Signals representing bits $p$, $t$, $q$, $u$ are fed to the inputs of X decoder 18'' and signals representing bits $v$, $r$, $w$, $s$ are fed to the inputs of Y decoder 19''.

X decoder 18'' provides the following output signals at the output lines indicated:

| | | |
|---|---|---|
| "0" | : | $\bar{p}\bar{t}\bar{q}\bar{u}$ |
| "4" | : | $ptqu + ptqu$ |
| "8" | : | $p\bar{t}\bar{q}\bar{u} + \bar{p}t\bar{q}\bar{u} + \bar{p}\bar{t}qu$ |
| "12" | : | $p\bar{t}\bar{q}u + p\bar{t}q\bar{u} + \bar{p}tq\bar{u} + \bar{p}\bar{t}qu$ |
| "16" | : | $ptq\bar{u} + p\bar{t}qu + \bar{p}tqu$ |
| "20" | : | $pt\bar{q}u + ptq\bar{u}$ |
| "24" | : | $ptqu$ |

Y decoder 19'' provides the following output signals at the output lines indicated:

| | | |
|---|---|---|
| "0" | : | $\overline{vrws}$ |
| "1" | : | $\bar{v}\bar{r}\bar{w}s + \bar{v}\bar{r}w\bar{s}$ |
| "2" | : | $v\bar{r}\bar{w}\bar{s} + \bar{v}r\bar{w}\bar{s} + \bar{v}\bar{r}ws$ |
| "3" | : | $\bar{v}r\bar{w}s + \bar{v}rw\bar{s} + v\bar{r}\bar{w}\bar{s} + v\bar{r}\bar{w}s$ |
| "4" | : | $vr\bar{w}\bar{s} + \bar{v}rws + v\bar{r}ws$ |
| "5" | : | $vr\bar{w}s + vrw\bar{s}$ |
| "6" | : | $vrws$ |

At the outputs 56'', 57'', 58'', 59'' there appear respectively the signals R1, R2, R4, R8 constituting respectively the bits of weight 1, weight 2, weight 4 and weight 8 of the word which is the residue modulo 9 of the sum of $tuvw$ and $pqrs$. This is also the residue of the sum of the seven data words being added; that is, the six addends $\mathbf{2}_1, \mathbf{2}_2 \ldots \mathbf{2}_n$ and the augend 1 as shown in FIG. 2. This residue is then transmitted to comparator 9 where it is compared with the output of modulo 9 residue calculator 8. If the two residues are not the same, comparator 9 indicates an error as indicated at 10 in FIG. 2.

Although the invention has been particularly shown and described with reference to the preferred embodiments thereof, it will be understood by those skilled in the art that the foregoing and other changes in form and details may be made therein without departing from the spirit and scope of the invention.

We claim:

1. A residue calculating circuit for calculating the residue of the sum of an augend and a plurality of addends and comprising multi-number adder means for adding an augend data word and a plurality of addend data words simultaneously in parallel to provide a subtotal sum in the form of a set of words each having a predetermined number of bits, a residue generator, and means for transmitting said subtotal sum words simultaneously in parallel to said residue generator, said residue generator including means for processing said set of subtotal sum words simultaneously in parallel to calculate the residues of said subtotal sum words and to calculate the residue of the sum of said residues.

2. A circuit as recited in claim 1 wherein said multi-number adder means comprises a plurality of column adders each corresponding to the bits of a respective predetermined weight of said augend and addends, each column adder comprising means for adding the bits of the respective predetermined weight of said augend and addends.

3. A circuit as recited in claim 1 wherein said residue generator means comprises a read only memory circuit.

4. A circuit as recited in claim 3 wherein said read only memory circuit comprises an array logic circuit.

5. A circuit as recited in claim 1 wherein said multi-number adder means comprises a plurality of column adders each corresponding to the bits of a respective predetermined weight of said augend and addends, each column adder comprising means for adding the bits of the respective predetermined weight of said augend and addends, said residue generator means comprising an array logic circuit.

6. A circuit as recited in claim 1 wherein said residue generator means comprises means for generating residues with respect to modulus 9.

7. A circuit as recited in claim 6 wherein said residue generator means comprises an array logic circuit.

8. A circuit as recited in claim 7 wherein said multi-number adder means comprises a plurality of column adders each corresponding to the bits of a respective predetermined weight of said augend and addends, each column adder comprising means for adding the bits of the respective predetermined weight of said augend and addends.

9. The residue calculating circuit as recited in claim 1 and further including adder means for calculating the sum of said augend and plurality of addends, residue calculator means for calculating the residue of said sum, and comparator means for comparing the result of said residue calculator means with the result of said residue calculating circuit.

10. A circuit as recited in claim 9 wherein said multi-number adder means comprises a plurality of column adders each corresponding to the bits of a respective predetermined weight of said augend and addends, each column adder comprising means for adding the bits of the respective predetermined weight of said augend and addends.

11. A circuit as recited in claim 10 wherein said residue generator means comprises a read only memory circuit.

12. A circuit as recited in claim 11 wherein said read only memory circuits comprises an array logic circuit.

13. A circuit as recited in claim 10 wherein said multi-number adder means comprises a plurality of column adders each corresponding to the bits of a respective predetermined weight of said augend and addends, each column adder comprising means for adding the bits of the respective predetermined weight of said augend and addends.

said residue generator means comprising an array logic circuit.

14. A circuit as recited in claim 10 wherein said residue generating means comprises means for generating residues with respect to modulus 9.

15. A circuit as recited in claim 14 wherein said residue generator means comprises an array logic circuit.

16. A circuit as recited in claim 15 wherein said multi-number adder means comprises a plurality of column adders each corresponding to the bits of a respective predetermined weight of said augend and addends, each column adder comprising means for adding the bits of the respective predetermined weight of said augend and addends.

17. A residue calculating circuit for calculating the residue of the sum of an augend and a plurality of addends and comprising multi-number adder means for simultaneously adding an augend data word and a plurality of addend data words to provide a subtotal sum in the form of a plurality of words each having a predetermined number of bits, means for dividing said bits of said subtotal sum words into a set of groups with each group including the bits of a predetermined range of weights, a set of residue generators each corresponding to a respective one of said groups of bits, means for transmitting each group of bits to its respective residue generator, each residue generator including means for generating the residue of the respective group of bits, and additional residue generator means for generating the residue of the sum of said residues of the groups of bits.

18. A circuit as recited in claim 17 wherein said multi-number adder means comprises a plurality of column adders each corresponding to the bits of a respective predetermined weight of said augend and addends, each column adder comprising means for adding the bits of the respective predetermined weight of said augend and addends.

19. A circuit as recited in claim 18 wherein each of said residue generator means comprises a memory circuit.

20. A circuit as recited in claim 18 wherein each of said memory circuits comprises an array logic circuit.

21. A circuit as recited in claim 17 wherein said multi-number adder means comprises a plurality of column adders each corresponding to the bits of a respective predetermined weight of said augend and addends, each column adder comprising means for adding the bits of the respective predetermined weight of said augend and addends, each of said residue generator means comprising an array logic circuit.

22. A circuit as recited in claim 17 wherein each of said residue generating means comprises means for generating residues with respect to modulus 9.

23. A circuit as recited in claim 22 wherein each of said residue generator means comprises an array logic circuit.

24. A circuit as recited in claim 23 wherein said multi-number adder means comprises a plurality of column adders each corresponding to the bits of a respective predetermined weight of said augend and addends, each column adder comprising means for adding the bits of the respective predetermined weight of said augend and addends.

25. The residue calculating circuit as recited in claim 17 and further including adder means for calculating the sum of said augend and plurality of addends, residue calculator means for calculating the residue of said sum, and comparator means for comparing the result of said residue calculator means with the result of said residue calculating circuit.

* * * * *